United States Patent
Flippin et al.

(10) Patent No.: US 10,934,195 B1
(45) Date of Patent: Mar. 2, 2021

(54) INTEGRATED METHANOGENIC AEROBIC SINGLE SLUDGE METHOD AND SYSTEM

(71) Applicant: Brown and Caldwell, Walnut Creek, CA (US)

(72) Inventors: Thomas Houston Flippin, Brentwood, TN (US); Jason W. Mullen, Adairville, KY (US)

(73) Assignee: Brown and Caldwell, Walnut Creek, CA (US)

( * ) Notice: Subject to any disclaimer, the term of this patent is extended or adjusted under 35 U.S.C. 154(b) by 0 days.

(21) Appl. No.: 16/402,449

(22) Filed: May 3, 2019

Related U.S. Application Data (60) Provisional application No. 62/667,154, filed on May 4, 2018.

(51) Int. Cl.
   *C02F 3/30* (2006.01)
   *C02F 3/00* (2006.01)
   *C02F 101/16* (2006.01)
   *C02F 103/26* (2006.01)
   *C02F 101/10* (2006.01)

(52) U.S. Cl.
   CPC .............. *C02F 3/301* (2013.01); *C02F 3/006* (2013.01); *C02F 3/308* (2013.01); *C02F 2101/105* (2013.01); *C02F 2101/16* (2013.01); *C02F 2103/26* (2013.01); *C02F 2203/004* (2013.01); *C02F 2209/08* (2013.01); *C02F 2209/10* (2013.01)

(58) Field of Classification Search
   CPC .......... C02F 3/301; C02F 3/006; C02F 3/308; C02F 2101/16; C02F 2103/26; C02F 2101/105; C02F 2203/004; C02F 2209/08; C02F 2209/10
   USPC ......................... 210/605, 620, 630, 906, 903
   See application file for complete search history.

(56) References Cited

U.S. PATENT DOCUMENTS

2014/0360933 A1* 12/2014 Rezania ................... C02F 3/307
   210/605

OTHER PUBLICATIONS

Yi Jing Chan et al., "A review on anaerobic-aerobic treatment of industrial and municipal wastewater", Chemical Engineering Journal, vol. 155, pp. 1-18, published 2009 (www.elsevier.com), Elsevier B.V. (Netherlands).
J.-C. Frigon et al., "The treatment of cheese whey wastewater by sequential anaerobic and aerobic steps in a single digester at pilot scale", Bioresource Technology, vol. 100, pp. 4156-4163, published 2009 (www.elsevier.com), Elsevier Ltd. (Netherlands).

* cited by examiner

*Primary Examiner* — Fred Prince
(74) *Attorney, Agent, or Firm* — Bush Intellectual Property Law; Kenneth M. Bush (57) ABSTRACT

A wastewater treatment method and system based on inoculating a bioreactor at startup with an integrated methanogenic aerobic single sludge with no additional inoculations thereafter to achieve anaerobic, aerobic, and/or anoxic treatment of industrial or municipal wastewater.

21 Claims, 6 Drawing Sheets

Z gallons

Fig. 3A
PRIOR ART

≤ Z gallons

INTEGRATED METHANOGENIC AEROBIC SINGLE SLUDGE METHOD AND SYSTEM

CROSS-REFERENCE TO RELATED APPLICATIONS

The present application claims priority to U.S. Provisional Patent Application No. 62/667,154 filed May 4, 2018, which is hereby incorporated by reference in its entirety herein.

FIELD OF THE INVENTION

The present invention relates to the field of wastewater treatment, and to methods and systems therefor.

BACKGROUND OF THE INVENTION

Treatment of industrial and municipal wastewater requires advanced technologies to comply with stringent effluent discharge requirements. Many modern systems for wastewater treatment rely on microbial sludges (biomass) for the removal of select organic compounds, biological oxygen demand (BOD), chemical oxygen demand (COD), total organic carbon (TOC), total suspended solids (TSS), nitrogen (N), and phosphorus (P). Wastewater treatment is designed to achieve one or more of the following results: oxidation of carbonaceous material; oxidation of nitrogenous matter; removal of nutrients (phosphate, ammonia-nitrogen, nitrite-nitrogen, and nitrate-nitrogen); discharging gases such as methane, carbon dioxide, and nitrogen (some for beneficial reuse); generation of a biological floc that is easy to settle, float, and/or filter; and generation of treated effluent that is low in dissolved and suspended matter.

Wastewater treatment generally involves processing influent wastewater through a continuous or intermittent processing system during which several operational parameters are monitored and controlled including, for example, flow rate, volume, aeration, temperature, pH, mixing, recycling, excess sludge wastage rate, etc. One of the most important parameters to consider is the biomass, or microorganism pool, by which undesirable materials are removed from the wastewater during aerobic, anoxic, and/or anaerobic treatment cycles.

Aerobic treatments often use an activated sludge (AS) in which organic laden wastewater is mixed with a suspended biomass in the presence of oxygen to produce biomass plus carbon dioxide. In some cases, a return activated sludge (RAS) is collected from a secondary clarifier and returned to the aeration tank to mix with incoming wastewater. The resulting mixed liquor may then be further processed in a batch or continuous flow system. In wastewater treatment processes, the biomass converts biodegradable materials to solids (biomass or sludge), water, and gas. Depending on the oxygen level, differing purification objectives can be achieved. For example, under fully aerobic conditions, removal of organics will predominate. Under aerobic and anoxic conditions both organics and nitrogen can be removed. If a system provides aerobic, anoxic, and anaerobic conditions, treatment can result in the removal of organics, nitrogen, and additional phosphorus.

Treatment under anaerobic conditions causes the hydrolysis of particulates in the wastewater to produce soluble organic matter, which is then converted to short chain organic acids. Thereafter, organic acids are converted to methane and carbon dioxide gases, which can provide a collateral energy recovery source. Anaerobic treatment is especially desirable for treating high-strength industrial wastewaters. However, without additional treatments it may be difficult to meet effluent discharge requirements. Therefore, anaerobic treatment is often followed by additional treatment processes under aerobic or anoxic-aerobic conditions.

A rate-limiting step in some wastewater treatment processes relates to the slow growth rate of some of the bacteria in a biomass, such as nitrifiers and those that break down complex organics. In such cases, long-operating sludge retention times (SRT) and large-volume reactors are needed to achieve the desired effluent quality.

Following biological treatment of wastewater, the biomass is separated from treated effluent prior to being discharged. Separation of the biomass is generally done by gravity sedimentation or by other solids-liquid separation process.

Sequencing batch reactor (SBR) activated sludge processes can eliminate the need for separate secondary clarification units. Fill-and-draw, or batch treatment systems such as an SBR use an activated sludge and cyclic, time-oriented active and inactive operation, with the entire treatment tank being used as both an active treatment reactor and a clarifier. A high degree of process control of all unit operations enables high treatment standards to be met with such systems.

The efficiency of prior wastewater treatment systems has been limited by certain design features of the reactor as well as by perceived limitations regarding the biomass. For example, prior treatments have generally provided separate zones for each oxidation state (i.e. aerobic, anoxic, anaerobic) to provide a suitable environment for the microorganisms that operate under those particular conditions. In addition, it has generally been believed that methanogens and other anaerobes require strict anaerobic conditions and that prolonged exposure to an aerobic environment would kill or seriously impair the growth of such organisms. Similarly, it has generally been believed that nitrifiers and other aerobes are strictly aerobic, and that prolonged exposure to an anaerobic environment would kill or seriously impair the growth and proliferation of these organisms. For these reasons, present practice in wastewater treatment provides separate treatment processes (reactors and solids separation devices) that separate the biomass to carry out anaerobic treatment, with the purpose of achieving methanogenic bacterial growth and methane production, and aerobic treatments. Additionally, current practice generally involves separate inoculations with specialized sludges to achieve anaerobic treatment and aerobic treatment. These and other constraints tend to complicate current wastewater treatment methods, and add to the cost of design and operation of such systems.

There remains a need for a more efficient wastewater treatment method and system that avoids the need for separate biomass cultures and sludges and/or the need for multiple inoculations with specialized, non-integrated sludges during treatment.

SUMMARY OF THE INVENTION

The present invention provides a method and system for treating wastewater that uses an integrated methanogenic aerobic single sludge (i.e. IMASS). The IMASS method provides one combined single-sludge in all zones (aerobic, anoxic, and/or anaerobic) with focused attention on the solids retention time (SRT) provided in each zone to achieve treatment objectives. IMASS allows treatment to occur in different stages of the same treatment process. In contrast, the prior art has typically relied on different treatment processes within an overall treatment system. When attempting to stage treatment in the same treatment process, the prior art has largely failed in achieving desired performance due to lack of proper attention to SRT. The IMASS method achieves greater efficiency at reduced costs compared with previous two-sludge wastewater treatment methods and systems.

Contrary to current practice, the present inventors have discovered that an integrated single sludge comprising methanogenic and/or active aerobic microorganisms can improve the efficiency and lower the costs associated with wastewater treatments that rely on two-sludge systems. The integrated single-sludge method of the present invention provides several advantages over existing two-sludge methods and systems including greater energy efficiency, energy recovery associated with methane generation, reduced nutrient requirements, low sludge production (historically associated with strict anaerobic treatment), and cost-savings by avoiding the need to operate a specialized, two-sludge system in multiple tanks.

It is an object of the present invention to provide an improved method and system for treating industrial or municipal wastewater by use of an integrated methanogenic aerobic single sludge.

In one embodiment, the present invention relates to a method for treating industrial or municipal wastewater based on use of an integrated single sludge.

In another embodiment, the present invention relates to a wastewater treatment system that uses an integrated single sludge in a new bioreactor or an existing bioreactor that has been modified to implement a method of the invention including, but not limited to, sequencing batch reactor, continuous flow system, oxidation ditch system, or any other type of biological wastewater treatment system.

These and other objects and advantages of the present invention will be apparent from the following description, the accompanying drawings, and the appended claims.

DETAILED DESCRIPTION OF THE INVENTION

As used herein, "IMASS" is an acronym for "integrated methanogenic aerobic single sludge" that relates to a method and/or system of the present invention for treating wastewater based on use of an integrated methanogenic aerobic single sludge that in the preferred embodiment includes an active biomass of fermenting, methanogenic, heterotrophic (including phosphorus accumulating organisms), denitrifying, and nitrifying (autotrophic) bacteria for treating wastewater.

As used herein, the term "IMASS system" refers to one or more bioreactor(s) that are configured to and/or are implementing a method of the invention. Generally, an IMASS system includes components that enable or facilitate application of the IMASS method, i.e. to accommodate anaerobic and aerobic treatment, or anaerobic and anoxic/aerobic treatment, in one or a plurality of reactor tanks. An IMASS system generally provides means for collecting off-gas produced during anaerobic treatment. Existing bioreactors can be retrofitted with one or more components such as a tank cap or cover to allow the system to take full advantage of the IMASS method, e.g. collecting off-gas and/or energy recovery therefrom.

The term "mixed liquor" refers generally to the combination of wastewater and biological mass (biomass) in a reactor.

As used herein, the term "sludge" may refer to different types of specialized sludges or biomass in a reactor, for example, activated sludge, waste sludge, nitrifying sludge, and the like. Specialized sludges are enriched for aerobic, anaerobic, or facultative bacterial species that grow efficiently under defined environmental conditions, specifically under aerobic, anaerobic, or anoxic conditions, respectively. As it pertains to the present invention, "sludge" may refer to a "single sludge", or to an "integrated single sludge" or "integrated methanogenic aerobic single sludge" that at least provides an active methanogenic and/or aerobic culture. If nitrification is to be provided, the aerobic seed culture should contain active nitrifying bacteria.

In the preferred embodiment, an integrated methanogenic aerobic single sludge provides fermenting, methanogenic, heterotrophic (including phosphorus accumulating organisms), denitrifying, and nitrifying bacteria. The IMASS is generally introduced into a reactor at startup by inoculating, for example, the anaerobic zone or tank of the reactor, with no further inoculations being provided thereafter. Inoculation with an integrated single sludge may be performed by adding a mixture of the aforementioned bacteria at the time of inoculation, or by adding separate specialized sludges at the time of inoculation, e.g. separate active methanogenic and separate active aerobic sludges.

As used herein, the term "heterotroph" or "heterotrophic" refers to an organism capable of removing carbon from water. This includes phosphorus accumulating organisms.

As used herein, the term "nitrifying" or "nitrifying organism" refers to a process and/or organism by which ammonia-nitrogen ($NH_3$) is converted to nitrite ($NO_2$) and, (most commonly), thereafter converted to nitrate ($NO_3$) by nitrification bacteria and/or archaea. Nitrite and/or nitrate is denitrified to $N_2$ gas by heterotrophic bacteria capable of performing denitrification.

As used herein the terms "tank", "reactor", and "bioreactor" generally refer to one or more vessels that may be continuous or divided wherein chemical, physical, and/or biological processes take place during a wastewater purification process. Some bioreactors are designed to accommodate multiple processes in the same reactor by providing separate zones, either physically-separated zones or temporally-separated zones, for conducting anaerobic, anoxic, and/or aerobic bioactivity. In any such system, there may be different tanks or sub-tanks to create the specialized environmental conditions needed to achieve the overall treatment objectives. "Bioreactor" may refer to a single reactor system; it may also include multiple stages. Exemplary bioreactors are known to the skilled artisan including, but not limited to, sequencing batch reactors (SBR) and oxidation ditch reactors. Exemplary anaerobic reactor designs include Upflow Anaerobic Sludge Blanket (UASB), Internal Circulation Reactors, Anaerobic Contact Reactors, Fixed Film/Bed Reactors, Hybrids, Fluidized Bed (FB) and Expanded Granular Sludge Blanket (EGSB). A bioreactor can be designed and manufactured to apply a method of the present invention, or alternatively, an existing bioreactor can be retrofitted with appropriate modifications to allow full application of a method of the invention.

As used herein, the term "active methanogenic culture" refers to a culture or biomass that contains actively growing methanogenic bacteria that can originate from any suitable source including, for example, from an anaerobic treatment vessel or zone of an actively operating bioreactor.

As used herein, the term "active aerobic culture" generally refers to a culture or biomass that contains actively growing facultative, heterotrophic (inclusive of some methanogens), and/or nitrifying bacteria that can derive from any suitable source including, for example, from an aerobic treatment zone or vessel of an actively operating bioreactor.

"Clarification" refers to a process wherein the biomass is separated from water during treatment of wastewater to produce the effluent, e.g. using a secondary clarifier.

"Solids retention time" (SRT) is the time that solids are held in the system, calculated as the mass of solids held in inventory divided by the rate at which solids are permanently removed or wasted from the system. The anaerobic and aerobic tank or zone SRTs are calculated as the mass of solids held under anaerobic and aerobic conditions, respectively, divided by the rate at which solids are wasted from the system. The SRT sets the mass of sludge retained in the system. An increase or decrease in SRT results in a corresponding increase or decrease in operating mixed liquor suspended solids (MLSS). In the preferred embodiment, an IMASS method of the invention includes selecting an appropriate SRT to be provided in each select zone (aerobic, anoxic, and/or anaerobic). The method may also include monitoring or evaluating the wastewater during or after treatment to determine if the treatment objectives are being achieved. Selection and adjustment of the total system and individual zone SRTs is the primary control parameter in design and operations, respectively.

As used herein "MLSS" refers to "mixed liquor suspended solids". An increase or decrease in SRT results in a corresponding increase or decrease in operating MLSS. Generally, a skilled artisan would select the size of a reactor tank to achieve the desired concentration of MLSS.

As used herein, the term "inoculating" or "inoculation" generally refers to introducing bacteria, or a culture of bacteria, or a biomass, or a sludge, or mixture thereof, into wastewater in a reactor for purposes of treatment. As used herein the term has particular relevance to the startup stage when a bacterial culture is initially introduced into a bioreactor to initiate the treatment process. In a preferred embodiment of the IMASS method, a single inoculation occurs at startup of the reactor with no further inoculations thereafter.

In one embodiment, the inoculate introduced at startup according to the IMASS method at least provides active aerobic cultures. In a preferred embodiment, the inoculate includes active methanogens and active aerobic cultures that are introduced in a single step as a mixture, or in two or more steps as separate active cultures.

As used herein, "wastewater" refers generally to any water that has been affected by human activity and/or use including but not limited to domestic, industrial, commercial, or agricultural activities, surface runoff, and sewage inflow or infiltration.

Figure 1:
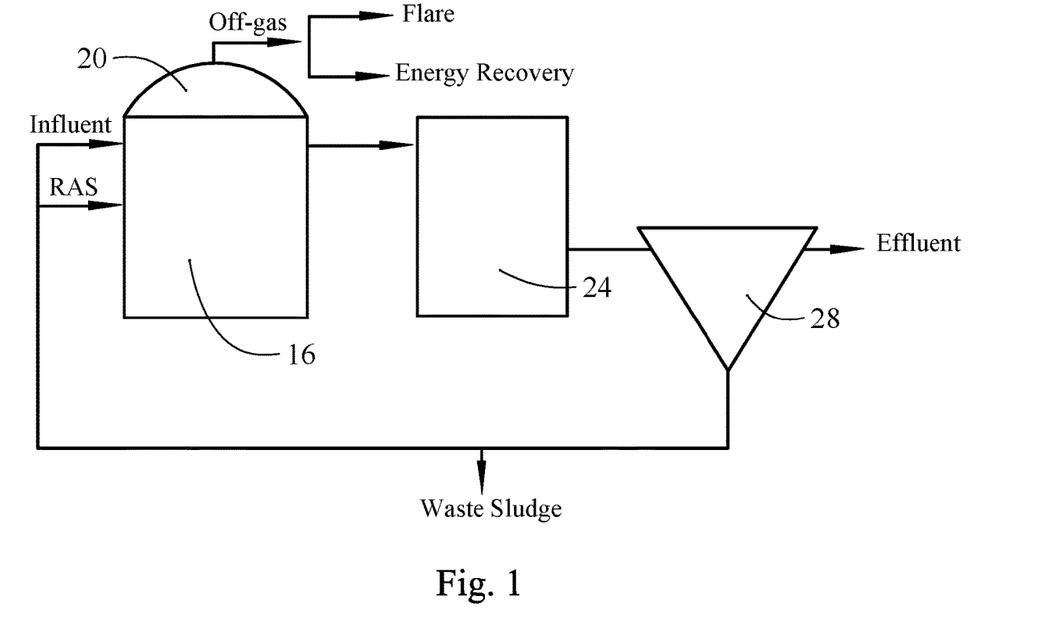
FIG. 1 provides a schematic representation of a traditional anaerobic contact process.

A mainstream anaerobic treatment system provides exclusive biological treatment of a process wastewater and typically does not receive biological sludge (such as waste or return activated sludge) from other treatment processes. FIG. 1 provides a schematic representation of a traditional anaerobic contact process as is known in the prior art. A traditional anaerobic contact process includes a reactor tank 16 and tank cap 20 from which off-gas can be directed to a flare or energy recovery. Tank 16 is in fluid communication with a de-gas tower 24 and secondary clarifier 28. Secondary clarifier 28 may be in the form of a dissolved air or gas flotation device. Influent wastewater and return activated sludge (RAS) are introduced into tank 16.

Anaerobic biological treatment generally occurs in two primary contexts. First, a single sludge can be exposed briefly to an anaerobic treatment zone (typically less than 3 hours) in the presence of readily degradable substrate, followed by a longer treatment time in an aerobic zone to achieve enhanced biological phosphorus uptake. In this type of anaerobic treatment, organic substrate removal is primarily accomplished through storage within the cell rather than metabolic conversion to produce methane and carbon dioxide.

In a second type of anaerobic treatment, a longer treatment duration is carried out to generate net cell growth and metabolic conversion to produce methane and carbon dioxide. Unlike the shorter-duration approach, longer-term anaerobic treatment maintains a separate biomass that is adapted for methane formation.

Anaerobic treatment provides several benefits over aerobic treatment for the same amount of substrate removal. For example, anaerobic treatment is capable of generating approximately 6 cubic feet of methane per pound of chemical oxygen demand (COD) removed. In addition, anaerobic treatment produces about 50% to 85% lower cell growth (sludge production) than aerobic treatment for the same COD removal, resulting in lower nutrient requirements. Moreover, anaerobic treatment requires lower power inputs for COD removal since the bioreactor only needs mechanical energy for mixing and gas handling but not for oxygen transfer. Finally, anaerobic treatment is more effective than aerobic treatment at removing certain compounds, and is much less exothermic, allowing treatment of higher temperature wastewaters without adverse effects.

Current wastewater treatment methods generally separate longer-term anaerobic treatment (which results in methane formation) from brief anaerobic/anoxic/aerobic treatment. The separation of anaerobic treatments in this fashion has led to a number of process variations. For example, in one variation a longer-term anaerobic treatment system is followed by anoxic/aerobic processes, or brief anaerobic/anoxic/aerobic treatment processes. Another variation starts with a brief anaerobic treatment followed by intermittent cycling in aerobic and anoxic zones, for example, in a sequencing batch reactor.

When low concentrations of organics or total nitrogen are required in the final effluent after anaerobic treatment, the general practice has been to treat with an additional, separate sludge specialized in anoxic/aerobic treatment.

The present inventors have found that an integrated single-sludge can be used to efficiently treat wastewater without the need for two specialized and separate treatment system sludges. Previous wastewater treatment methods were based on the belief that an integrated, combined single-sludge treatment would not be effective because (a) methanogens are strict anaerobes that are seriously growth-impaired or killed under prolonged exposure to an aerobic environment, and (b) nitrifying organisms (e.g. *Nitrosomonas* and *Nitrobacter*, which convert ammonia-nitrogen to nitrite-nitrogen and then to nitrate-nitrogen) are strict aerobes that are seriously growth-impaired or killed under prolonged exposure to an anaerobic environment. Thus, prior wastewater treatment methods separately inoculated two different treatment systems operated in series with specialized sludges, namely an anaerobic system with methanogens, and an aerobic system with aerobes, to avoid exposing methanogens to aerobic conditions, and aerobes to anaerobic conditions.

In one aspect, the present invention provides a wastewater treatment method. Unlike previous methods in which a plurality of specialized single sludges were provided through different processes of the overall treatment system (i.e. anaerobic, aerobic, and anoxic), in the preferred embodiment of the present method a one-time inoculation with an integrated single-sludge occurs at startup of the reactor. The integrated single sludge at least includes facultative bacteria and preferably includes methanogens, heterotrophs, nitrifying and denitrifying bacteria to achieve anaerobic treatment including fermentation, enhanced biological phosphorus uptake, and methanogenic activity (i.e. conversion of volatile acids to methane), anoxic treatment to achieve denitrification (i.e. conversion of nitrite and nitrate to nitrogen gas), and aerobic treatment to achieve enhanced biological phosphorus uptake, reduce organics to low levels, and nitrification (conversion of ammonia-nitrogen to nitrite and/or nitrate).

IMASS Treatment Method and System

The present invention relates to an improved wastewater treatment method. In the preferred embodiment, an integrated single sludge is introduced at startup to operate under select solids retention times (SRTs) under all zones of treatment that are included (i.e. aerobic, anoxic and anaerobic), rather than providing multiple specialized sludges in separate treatment processes. Successfully achieving the objective(s) for treatment may be determined during treatment, or at the end of treatment by evaluating the wastewater or effluent by any suitable means known to the skilled artisan. Selection and adjustment of the total system and individual zone SRTs is the primary control parameter in design and operations, respectively.

An IMASS method of the invention provides greater efficiency at lower cost for both brief and longer-term anaerobic, anoxic, and aerobic treatments in a variety of bioreactor types. A method of the invention can be incorporated into the design of a new system, or applied as a retrofit to currently existing batch or continuous bioreactors. In some instances, design changes may be necessary or desirable to realize the full range of features and benefits provided by the present method. For example, as discussed more fully infra, an existing reactor or system may need to be retrofitted with a cap or other collection device over the tank in order to recover methane gas produced by long-term anaerobic treatment.

In accordance with one aspect of the present invention, a wastewater treatment method is provided which utilizes a single integrated sludge comprising or consisting essentially of fermenting, methanogenic, heterotrophic, denitrifying and nitrifying bacteria. Unlike previous methods in which separate, specialized sludges were needed for different oxidation treatment processes (i.e. anaerobic and aerobic) to achieve adequate treatments, the present method provides a single integrated sludge to achieve the full spectrum of treatment objectives including anaerobic, aerobic and anoxic treatments, without the need to maintain and treat with separate, specialized sludges for each differing and desired environmental condition. In a preferred embodiment, the present invention provides a one-time inoculation with an integrated single sludge at the startup stage without additional inoculations thereafter.

Treatment of wastewater by the IMASS method can be initiated under anaerobic or aerobic conditions. Preferably, treatment is initiated under anaerobic conditions by inoculation with a sludge that at least includes active methanogenic or active aerobic culture. In the preferred embodiment, the IMASS method is initiated under anaerobic conditions by inoculation with an integrated methanogenic aerobic single sludge that includes fermenting, methanogenic, heterotrophic, denitrifying, and nitrifying bacteria. Contrary to common belief, inoculating an anaerobic treatment zone with an integrated single sludge containing methanogens, heterotrophs, and nitrifying bacteria not only provides immediate anaerobic treatment (owing to the anaerobic population in the inoculate) but also primes the system for rapid turnover to aerobic and/or anoxic treatment zones at subsequent stages.

A wastewater treatment method according to the present invention provides multiple improvements over present wastewater treatment methods including reducing the solids content, biological oxygen demand (BOD), phosphorus content, and nitrogenous content of wastewater, by use of an integrated single sludge for operation in sequential anaerobic, aerobic and/or anoxic treatment zones. Sequential treatment zones of the present method may be provided by any means known to the skilled artisan including, for example, by physical separation using separate tanks, barriers, and/or filters, or by temporal separation in a single tank, as with an SBR system.

In accordance with one embodiment of an IMASS method of the invention, influent municipal or industrial wastewater is introduced into an anaerobic treatment zone of a reactor and inoculated with an integrated single sludge. The integrated single sludge can most effectively be provided by combining sludges from anaerobic treatment reactors and aerobic treatment reactors that are providing nitrification. Inoculation of a reactor with an integrated single sludge can be accomplished by any suitable means, preferably such that a reactor or tank is seeded with an active sludge containing methanogens, and/or heterotrophs, and/or nitrifying bacteria. In a preferred embodiment, a reactor is seeded with active sludge containing methanogens, heterotrophs, and nitrifying bacteria. The ratio between methanogens, heterotrophic, and nitrifying bacteria in the inoculate is not critical. If desired, the ratio can be determined beforehand by applying conventional design parameters. For example, a system can be started by inoculating an anaerobic zone with an active culture taken from an aerobic zone of a reactor that provides biological nitrification, and with an active culture taken from an anaerobic zone of a reactor that provides methanogenesis.

In the preferred embodiment, the overall cycle time for carrying out the anaerobic step of a treatment cycle is defined by the solids retention time (SRT) required under anaerobic treatment. The required SRT can be calculated using conventional design parameters. The cycle time will vary depending on factors such as temperature, type, and concentration of impurities being treated. Influent wastewater may contain any number of pollutants including, for example, ammonia, organic nitrogen, nitrates, nitrites, soluble and insoluble hydrocarbons, cellulose fibers, settleable and colloidal solids and other organic materials, inorganic solids or grit, fats, oils, grease and phosphorus and the like. Optionally, influent wastewater may be pretreated by filtering, screening, and the like before introduction into the anaerobic treatment zone of a reactor.

Without intending to limit the scope of the invention and solely for purposes of illustration, certain aspects of the IMASS method will now be described with reference to an SBR system. However, it should be understood that a method and/or system of the invention is not limited to any particular reactor type, and any other type of reactor can be used.

Initially, wastewater is introduced into an SBR tank. The tank is equipped with a cover or cap to enable collecting off-gas such as methane that is produced during the treatment cycles. The tank cover can be designed with standard operation capabilities including, for example, means for recovering off-gas and discharging off-gas to a flare, other control device, or an energy recovery device, such as a steam generator or gas-to-electricity turbine (depending on the measured composition of the off-gas). The tank is inoculated with an integrated single sludge comprising methanogenic, heterotrophic, and nitrifying bacteria to start an initial anaerobic treatment cycle.

Certain embodiments of the IMASS method of the present invention include one or more cycles of the following steps:
Step 1: Introduce a predetermined amount of influent wastewater into an anaerobic zone of a reactor (e.g. a sequencing batch reactor);
Step 2: Inoculate the anaerobic zone with an integrated methanogenic aerobic single sludge preferably containing active methanogens, active heterotrophs, and active nitrifying bacteria. The amount or proportion of bacteria to be added may be estimated by design parameters known to the skilled artisan. However, it should be noted that the proportion of bacteria added will equilibrate over time based on the treatment system configuration and process conditions (e.g. SRT) provided.
Step 3: Initiate an anaerobic treatment cycle and direct off-gas to a flare or other control device until methane reaches an acceptable level, then divert (if desired) to a steam generation or gas-to-electricity turbine.
Step 4: Initiate an aerobic treatment cycle; direct off-gas to a flare, other control system, or energy recovery system until methane has decreased to an acceptable level. Thereafter, off-gas can be directed to the ambient environment.
Step 5: Cycle between aerobic, anoxic, and anaerobic periods; or between aerobic and anaerobic periods as desired to control the degree of methanogenesis, nitrification, and denitrification to meet treatment objectives.
Step 6: Initiate a settling step to allow waste liquid to be maintained without substantial mixing or aeration to provide clarified wastewater. Clarified effluent can then be withdrawn from the upper or middle zone by decantation.

Design of New IMASS Method

In the preferred IMASS method an initial anaerobic treatment zone is sized using the appropriate design approach for an anaerobic contact process, with allowance for the nitrifiers in the mixed liquor. An important design parameter to consider relates to anaerobic SRT (and related MLSS concentration including nitrifiers). The design approach for the subsequent processes (e.g. aerobic treatment) will be those of current appropriate design practices (with focus on design SRT under aerobic conditions). In one aspect of the IMASS method, a brief pause of about 5 minutes to about 15 minutes can be allowed in the first aerobic zone downstream of the initial anaerobic zone.

It should be recognized that the non-nitrifying bacteria grown under anaerobic conditions will largely be facultative (inclusive of archaea) and therefore available under aerobic conditions to perform carbon removal. Additionally, nitrifying bacteria grown under aerobic conditions will remain inactive under anaerobic conditions, and anaerobic and aerobic sludge digestion will occur as normal. Generally, there will be a 5-minute to 15-minute pause in substrate removal as bacteria switch from anaerobic treatment to aerobic treatment and vice versa. The ratio of aerobic volume to aerobic plus anaerobic volume is the ratio of aerobic SRT to system-wide SRT.

An example step-wise protocol for this development is described below.
Step 1. Bypass 0 to 10 percent of influent around the anaerobic zone to an aerobic zone (as needed) to produce a desired amount of filamentous bacteria growth in the aerobic zone. The degree of bypass required can be determined through treatability testing or trial and error testing in full-scale implementation.
Step 2. Based on treatment objectives, select operating solids retention times (SRTs) in both anaerobic and aerobic conditions. Select the desired mixed liquor suspended solids (MLSS) for solids liquid separation. Assume that the process will produce a good settling sludge (less than 100 milliliters per gram) and be able to support a membrane flux equivalent to extended aeration activated sludge.
Step 3. Select appropriate sludge growth (yield) coefficients and influent solids degradation coefficients through experience or treatability testing following appropriate practice recognized approaches.
Step 4. Perform process calculation iterations to determine reactor volume size (s) to satisfy the objectives listed in Step 2 using appropriate practice recognized approaches.
Step 5. Avoid unionized ammonia-nitrogen ($NH_3$) concentrations present in the anaerobic zone that would cause bio-inhibition to nitrifiers (when applicable).
Step 6. Increase the anaerobic and aerobic HRT and associated volume by about 5 to about 15 minutes to account for the pause (based on treatability testing data or experience).
Step 7. Calculate oxygen requirements in the aerobic zone inclusive of the endogenous oxygen demands of the entire non-nitrifying biomass at its combined SRT (anaerobic plus aerobic SRT). The anaerobic SRT will dictate conversion of COD to methane. The combined total system broader SRT will dictate how COD removal proceeds while the aerobic SRT will dictate how nitrification proceeds.

Step 8. Subdivide anaerobic zone into a bio-P zone and broader anaerobic treatment zone if bio-P removal is needed. Design bio-P zone using appropriate practice recognized approaches.

Step 9. If denitrification is required, consider recirculating mixed liquor from aerobic zone to bio-P zone, or broader anaerobic treatment zone. Denitrification (historically assigned to an anoxic zone) will occur in an anaerobic zone, and this will increase nitrogen gas in off-gas from anaerobic treatment. Denitrification in the broader anaerobic zone will also decrease the amount of carbon available for methane generation during anaerobic treatments. Bio-P, denitrification, and associated impacts can be estimated using appropriate practice recognized approaches.

Step 10. Design solids separation step e.g., dissolved air flotation (DAF) and secondary clarification assuming a sludge volume index (SVI) of 40 to 100 ml/g using appropriate practice recognized approaches. If using membrane separation, assume a membrane flux equivalent to that of extended aeration activated sludge. Treatability testing can be conducted to determine the anticipated sludge settleability and sustainable membrane flux.

Operational Considerations

The operational considerations that are applicable to each unit process remain applicable when included in an IMASS method and system. For example, off-gas composition during anaerobic treatment will vary depending on the processes included. Denitrification in the anaerobic zone will increase nitrogen in the off-gas. Off-gas can be used for mixing in the anaerobic zone. The anaerobic zone can also be mixed using high internal recirculation rates between the aerobic zone and anaerobic zone while also accomplishing denitrification.

IMASS Start-Up

In one embodiment, start-up of the IMASS process is initiated by seeding the anaerobic zone with a sludge that at least includes active aerobic bacteria, most preferably with an integrated methanogenic aerobic single sludge. Start-up can be initiated most quickly by seeding the aerobic zone with a nitrifying activated sludge, and seeding the anaerobic zone with active methanogens, for example, from a mainstream anaerobic facility. As with any system, the population will establish itself based on the influent feed source and the partitioning of anaerobic and aerobic SRTs.

Cycle times of an SBR for the steps employing an IMASS method and the overall process time will depend on a variety of system design parameters, as well as the wastewater impurity loading, the water temperature, and similar factors. The initiation of each step, and the conclusion of a preceding step may be controlled in any suitable manner, such as on a timed basis, or by various water level conditions in the treatment system, or measurements made by on-line sensors (e.g. oxidation reduction potential). Timing for each sequential processing step may also be controlled by appropriate sensors such as oxygen and nitrate sensors. The total treatment cycle is generally designed to require less than one day. The exact time will depend, for example, on organic and/or nitrogen loading levels. The fill step is typically carried out for about 5% to about 15% of the total treatment cycle time. The interaction step (inclusive of the fill cycle) is typically carried out for about 80% of the total treatment cycle time. The settling step is typically carried out for about 10% of the total treatment cycle time. A decantation step can be carried out for about 10% of the total treatment cycle time.

As with any wastewater treatment system, waste solids will be removed from the IMASS treatment system. For example, a portion of waste solids may be removed from the aerobic treatment zone during or after decantation of clarified effluent in accordance with conventional practice. By including anaerobic treatment in the IMASS system, total solids production can be reduced, and removal of additional biological phosphorous is facilitated in subsequent aerobic zones.

The IMASS system single sludge can be provided in a variety of ways. For example, a reactor can be seeded with a biomass that includes methanogenic, heterotrophic, denitrifying, and nitrifying bacteria. Alternatively, a combined single sludge can be prepared by separately seeding a reactor with different microbial inoculates containing or consisting essentially of methanogenic, heterotrophic, denitrifying, and nitrifying bacteria. For example, a suitable anaerobic biomass seed culture can be collected from an upflow anaerobic sludge blanket reactor (UASB), or other mainstream anaerobic treatment system, or any other suitable source for such a biomass or culture. Anaerobic digestor sludge may be used but it has the liability of a low biological activity and high nutrient content (ammonia-nitrogen and phosphorus). Thereafter, an active aerobic culture with nitrifying bacteria, or a pure nitrifier culture can be added to the reactor.

In another embodiment, the present method relates to exposing influent wastewater or pretreated wastewater in a reactor to an integrated single sludge wherein the single sludge comprises a combination of any of at least two or more active cultures taken from anaerobic, anoxic, and/or aerobic environments. In one aspect, a single sludge of the present invention provides a biomass that includes microorganisms normally found in active anaerobic and aerobic environments. In another aspect a single sludge of the present invention includes microorganisms normally found active in anaerobic, anoxic, and aerobic environments.

Applications of IMASS to an Existing Wastewater Treatment System

An IMASS method can be carried out in to any existing wastewater treatment reactor. Generally, existing systems will be retrofitted with one or more additional system design components, generally of a conventional nature. For example, as depicted in FIGS. 2A-2B, 3A-3B, and 4A-4B, the IMASS method of the invention can be applied to existing systems including, but not limited to, SBR, oxidation ditch, and conventional biological nutrient removal systems. Some retrofits could require installing an appropriate cover and/or control device over the reactor or zone thereof (e.g. anaerobic zone) in order to capture off-gas production such as methane production.

Figure 2A:
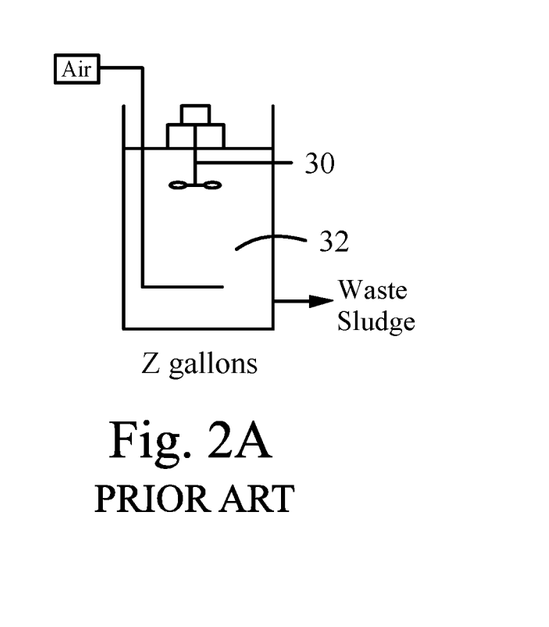
FIG. 2A provides a schematic representation of a conventional sequencing batch reactor.
Figure 2B:
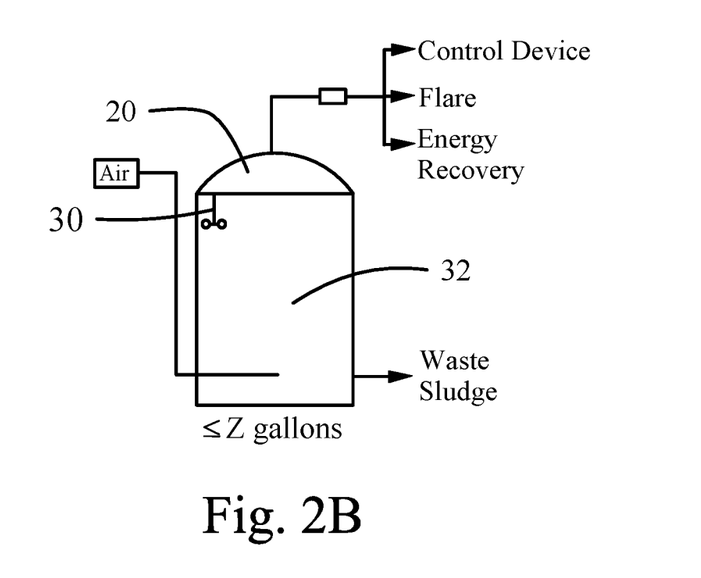
FIG. 2B provides a schematic representation of a conventional sequencing batch reactor retrofitted to implement a method of the present invention.

SBRs can be configured to implement a method of the invention. Such SBRs can be newly fabricated, or existing SBRs can be modified and retrofitted to implement an IMASS method of the invention, generally as depicted in FIGS. 2A-2B, which schematically represent a conventional SBR (FIG. 2A) with tank 32 and mixer 30, and an SBR that has been modified to implement the IMASS method (FIG. 2B). An SBR fabricated to implement the IMASS method of the invention, or an existing SBR modified to implement the method, includes a tank 32, mixer 30, and tank cover or cap 20 by which off-gas can be recovered or directed to energy recovery, a flare, or other control device. An SBR newly fabricated, or modified, to implement the IMASS method is more efficient than a conventional SBR and requires less power to operate (10% to 80% of power consumed by conventional SBR), and requires less sludge disposal (15% to 30% of a conventional SBR).

Figure 3A:
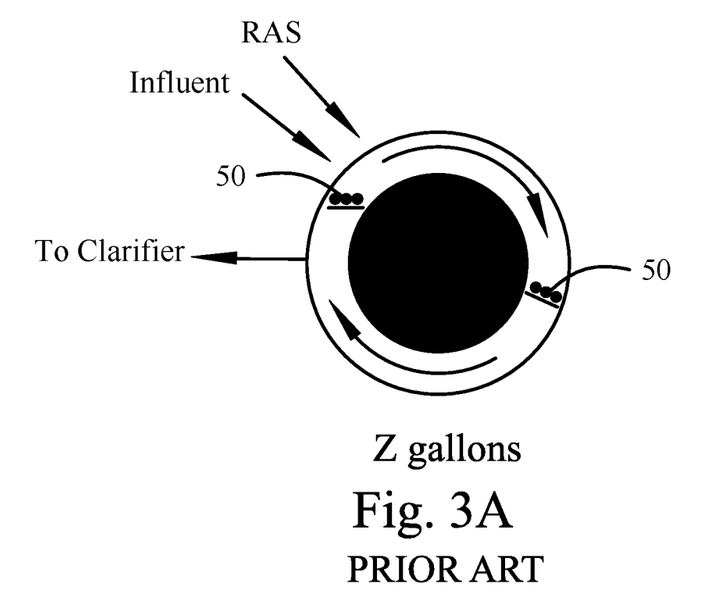
FIG. 3A provides a schematic representation of a conventional oxidation ditch reactor.
Figure 3B:
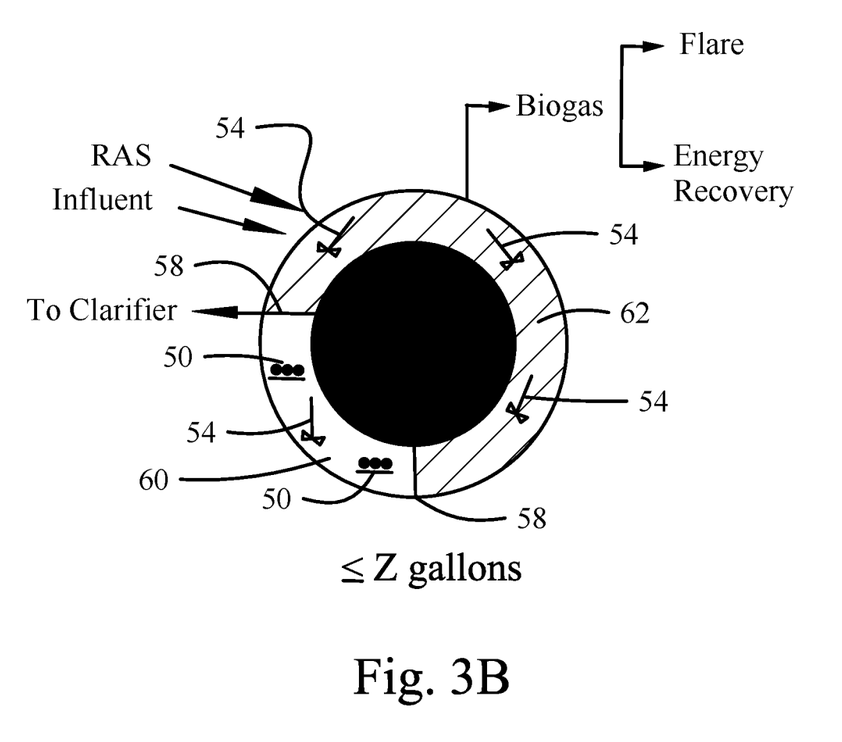
FIG. 3B provides a schematic representation of a conventional oxidation ditch reactor modified for implementation of the IMASS method of the present invention.

Oxidation ditches can be configured to implement a method of the invention. Such oxidation ditches can be newly fabricated, or existing oxidation ditches can be modified and retrofitted to implement an IMASS process of the invention. As shown in FIGS. 3A-3B, aeration equipment 50 provides single directional horizontal velocity in the traditional oxidation ditch system (FIG. 3A), while in a modified oxidation ditch (FIG. 3B) aeration equipment 50 does not produce directional mixing. A modified ditch also includes a plurality of mixers 54, partitioning walls 58 that separate the effluent mixed liquor from the initial anaerobic zone (where influent wastewater and return activated sludge are combined). Off-gas from the covered anaerobic zone 62 is routed to a flare, other control device, or energy recovery device. The design approach for the anaerobic zone can be the same as that used for the anaerobic contact process with allowance for nitrifiers present in the mixed liquor. The initial anaerobic zone 62 and subsequent downstream aerobic zone 60 is sized to accommodate a 5-minute to 15-minute pause. Despite this nuance, the aerobic and anoxic zones are generally designed using appropriate current design approaches. Implementation of the IMASS method in an oxidation ditch reactor provides the advantage of less sludge disposal (15% to 80% of traditional oxidation ditch) and lower square feet of required clarification (50% to 80% of traditional oxidation ditch) than a conventional oxidation ditch. In addition, while the modified ditch consumes additional power to run mixers, the overall power consumption is about the same as that with a conventional ditch because the power required by the modified ditch for aeration is less than that required by the conventional ditch.

Figure 4A:
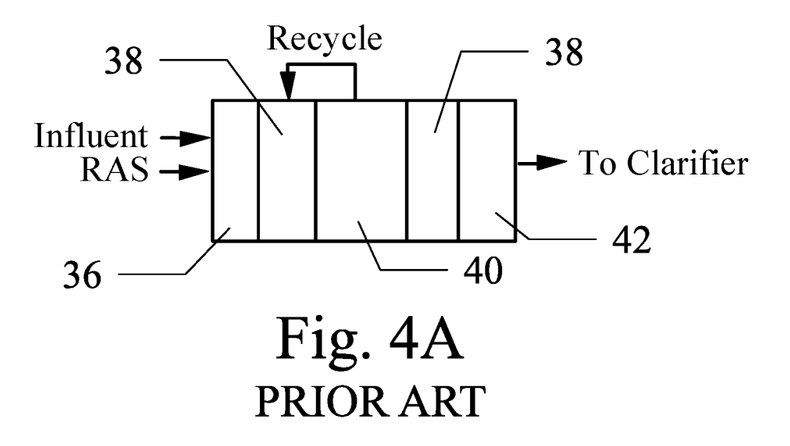
FIG. 4A provides a schematic representation of a conventional multi-step treatment system.
Figure 4B:
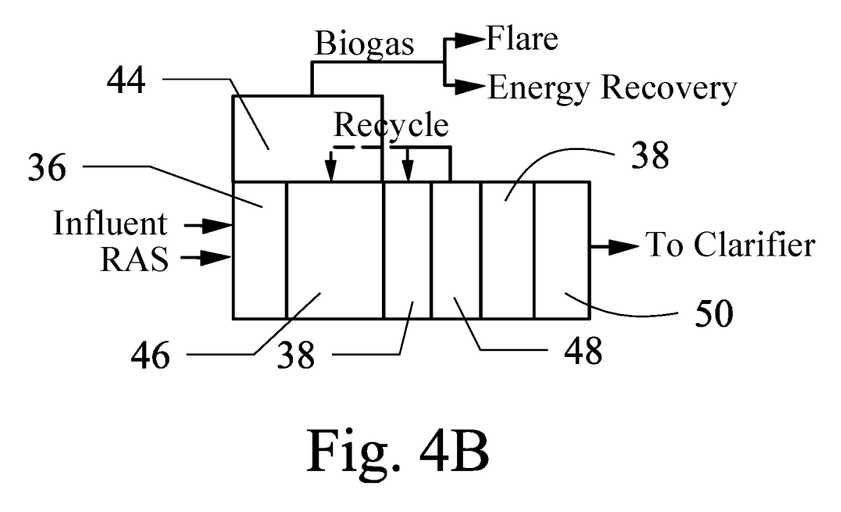
FIG. 4B provides a schematic representation of a conventional multi-step wastewater treatment system modified to implement the IMASS method of the present invention.

Multi-step treatment systems can be configured to implement an IMASS method of the invention. Such systems can be newly fabricated, or existing conventional multi-step treatment systems can be modified and retrofitted for implementation of the IMASS method generally as shown in FIGS. 4A-4B. A conventional multi-step system for biological nutrient removal (FIG. 4A) includes an anaerobic Bio-P zone 36, anoxic zones 38, aerobic zone 40, and aerobic zone 42. An IMASS-modified system (FIG. 4B) includes an anaerobic Bio-P zone 36, anaerobic zone 46, cover 44 over anaerobic Bio-P zone 36 and anaerobic zone 46, anoxic zones 38, first aerobic zone 48, and optional second aerobic zone 50. The anaerobic Bio-P zone 36 and anaerobic zone 48 can be combined in some applications. The increased volume in this zone (36 and 48 combined) is offset by the smaller first aerobic zone 48 required. Moreover, less power is consumed, and less sludge must be disposed (15% to 80% of conventional system sludge disposal). Additionally, lower square feet is required for clarification (50% to 80% of conventional system).

Other treatment process variations can be modified to implement a method of the invention in a manner known to the skilled artisan to include anaerobic treatment as the first stage of treatment where return activated sludge and influent are combined. The design for the initial anaerobic zone can be the same as that used for an anaerobic contact process with allowance for the nitrifiers in the mixed liquor and inclusion of a 5-minute to 15-minute pause. The design approach for subsequent processes can be those of current design practices with allowance for a 5-minute to 15-minute pause in the aerobic zone downstream of the anaerobic zone.

Retrofitting current systems to allow application of the IMASS method is expected to provide several benefits including energy recovery associated with methane generation, reduced energy and nutrient requirements, and lower sludge production associated with anaerobic treatment, anaerobic digestion of sludge generated in the aerobic zone, and aerobic digestion of sludge generated in the anaerobic zone. Additional savings are expected by avoiding the costs associated with operating a two-sludge system. For all retrofits, preferably about 10 percent of the influent wastewater should be directed to the first aeration zone in order to cultivate the desired degree of filamentous bacterial growth to aid in solids-liquid separation. Without sufficient filamentous bacteria, effluent total suspended solids and associated particulate constituents could be undesirably high.

Design of IMASS System

An IMASS system of the invention will generally include an initial anaerobic treatment zone sized using the design approach for an anaerobic contact process with allowance for a 5-minute to 15-minute pause and the presence of nitrifiers in the mixed liquor. The design for subsequent processes will be those of current appropriate design practices with the nuance of allowing a brief pause in the first aerobic zone downstream of the initial anaerobic zone. In nearly all cases, the anaerobic zone will be the largest zone since the specific growth rate is significantly lower than that of nitrifying bacteria. Typically, the anaerobic zone will be 4 to 6 times larger than the aerobic zone depending upon the degradability of the organics present in the wastewater, and whether nitrification is required. Schematic representations of an IMASS system and process flow is provided in FIGS. 2B, 3B, and 4B for a variety of bioreactors including an SBR process, oxidation ditch process, and conventional multi-step process, respectively.

While the form of the method and system herein described constitutes one or more preferred embodiment(s) of the invention, it should be understood that the invention is not limited to the precise form of apparatus or device, and that changes may be made therein without departing from the scope of the invention.

Example 1

Treatment of Bean Processing Wastewater by IMASS

Figure 5:
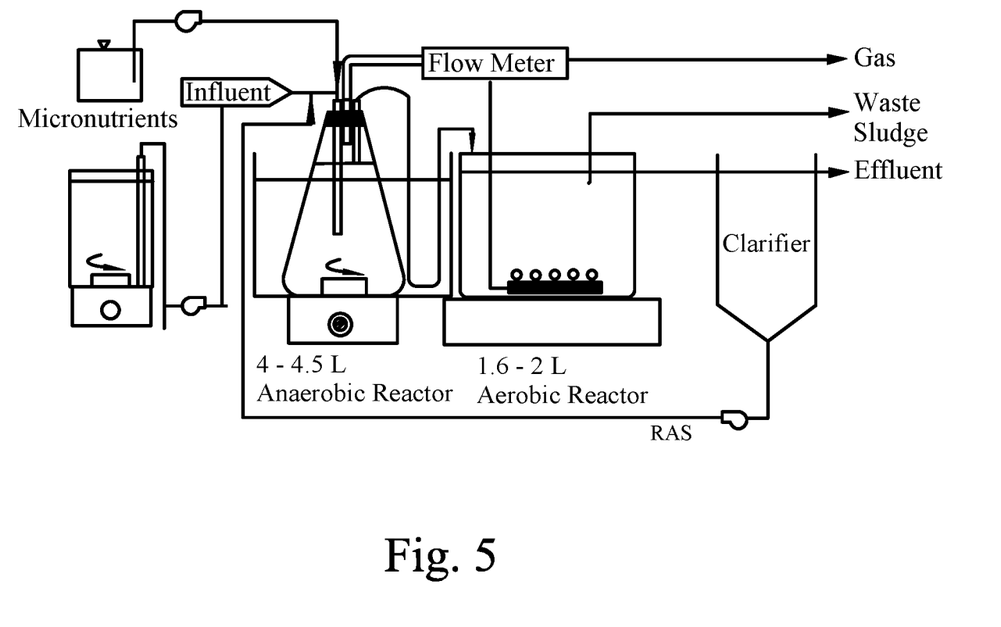
FIG. 5 presents a schematic representation of a conventional bench-scale bioreactor discussed in Examples 1-2 and 4 with a conventional anaerobic contact process followed by conventional activated sludge.

Bean processing wastewater was treated by the IMASS method in the bench-scale bioreactor schematically depicted in FIG. 5. An integrated methanogenic aerobic single sludge for inoculation into the bioreactor was prepared by adding biomass from a full-scale UASB treating pre-screened processed bean wastewater. No heterotrophic bacteria were added from any anoxic or aerobic biological treatment process. The process was initiated as a sequencing batch reactor to determine if the seed biomass would respond to aerobic biological conditions. An 18-hour anaerobic feed cycle was followed by a 6-hour aerobic reaction time. An initial pause of 15 minutes was observed between the start of the aeration cycle and observed oxygen uptake, which reduced to a 5-minute pause within the first week of operation.

The process operated at a system-wide SRT of 20 days (15 days anaerobic followed by 5 days aerobic) for a period of 25 days. The mixed liquor alternated between a 10-hour anaerobic exposure at 35° C. and 3.7-hour exposure at 23° C. The anaerobic zone was maintained at pH 6.5 to 7.2, and the aerobic zone was maintained at pH 7.4 to 8.4. Within 3 HRTs, the influent soluble COD was reduced from 7,300 mg/L to 1,410 mg/L in the anaerobic zone which operated at an ORP of −410 millivolts and volatile fatty acids concentration of approximately 900 mg/L, while resulting in daily gas production.

The aerobic zone discharged a soluble COD of 600 mg/L, with effluent concentrations of 2 mg/L dissolved oxygen, 300 mg/L TSS, 19 mg/L ammonia-nitrogen (NH3-N), 28 mg/L PO4-P, and 1,800 mg/L alkalinity (as calcium carbonate). Examination of the mixed liquor under the microscope at 100 to 400 times magnification revealed a floc devoid of filaments.

This experiment demonstrated that native biomass grown in exclusively anaerobic biological treatment systems contain facultative heterotrophs capable of providing carbon removal in aerobic environments with little or no acclimation time. Moreover, methanogenic bacteria survived prolonged aerobic exposure, abrupt changes in pH of greater than 1.0 unit, and abrupt changes in temperature of greater than 11° C. Finally, an IMASS system can produce a floc devoid of filaments. Bypass of raw influent around the anaerobic zone would likely be required to grow filaments and reduce effluent TSS.

Example 2

Treatment of Ethanol Laden Wastewater by IMASS

Based on the findings in Example 1, the bench-scale reactor was switched to ethanol-laden wastewater for subsequent evaluation. The system-wide SRT was increased to 34 days (25 days anaerobic and 9 days aerobic) to reduce anaerobic zone volatile fatty acids. The system was operated an additional 33 days. The mixed liquor alternated between a 10-hour anaerobic exposure at 35° C. and 3.7-hour aerobic exposure at 23° C. The anaerobic zone was maintained at pH 6.5 to 7.0, and the aerobic zone was maintained at pH 7.5 to 8.5. At the end of this study, 87 percent of the biomass in this system had been produced under an IMASS configuration that originally began with a sludge taken from an exclusive anaerobic treatment system. A summary of performance data from this study based on daily influent and final effluent analysis, and a single day's measurement of gas production (2.0 liters/day at 83 percent methane content determined by volume accumulation in Tedlar bag and same bag analyses of gas composition) is provided in Table 1.

TABLE 1

Results of IMASS treatment of ethanol-laden wastewater.

| Parameter | Daily Influent | Wastage | Final Effluent |
| --- | --- | --- | --- |
| Liquid Flow, L/day | 1.7 | 0.18 | 1.5 |
| TSS, g/day | 0.27 | 1.2 | 0.52 |
| VSS, g/day | 0.080 | 0.94 | 0.40 |
| COD, g/day | 20 | 0.40 | 3.4 |
| Soluble COD, g/day | 20 | 0.20 | 1.7 |

The performance data from this study showed the following:
1. Continued methane production following prolonged biomass exposure to aerobic conditions was confirmed.
2. Biomass grown within the IMASS configuration was able to support sustained methanogenesis.
3. Methane production implies that the anaerobic reactor removed approximately 5.1 g/day of COD, while the system wide COD removal was 16 g/day.
4. The observed solids yield of 0.073 grams TSS produced per gram COD removed is consistent with anaerobic biological treatment alone (0.1 to 0.5 grams TSS per gram COD removed) indicating that biomass generated during aerobic degradation subsequently underwent anaerobic sludge digestion. The measured methane production likely understates the degree of anaerobic treatment provided. The bench-scale system apparently lost significant methane dissolved in the anaerobic reactor effluent.

In addition, the effluent contained surplus ammonia-nitrogen (6 mg/L), orthophosphate-phosphorus (0.9 mg/L), alkalinity (1800 mg/L as calcium carbonate), and a high concentration of colloidal COD. The total effluent COD was 2,300 mg/L which remained at 1,800 mg/L following 1.5-micron nominal filtration and was reduced to 1,100 mg/L following 0.45-micron filtration with a measured effluent TSS of 350 mg/L. Examination of the mixed liquor under the microscope at 100 to 400 times magnification revealed a floc devoid of filaments explaining the elevated effluent TSS and colloidal concentrations.

Example 3

Treatment of Organic Chemicals Wastewater by IMASS

Figure 6:
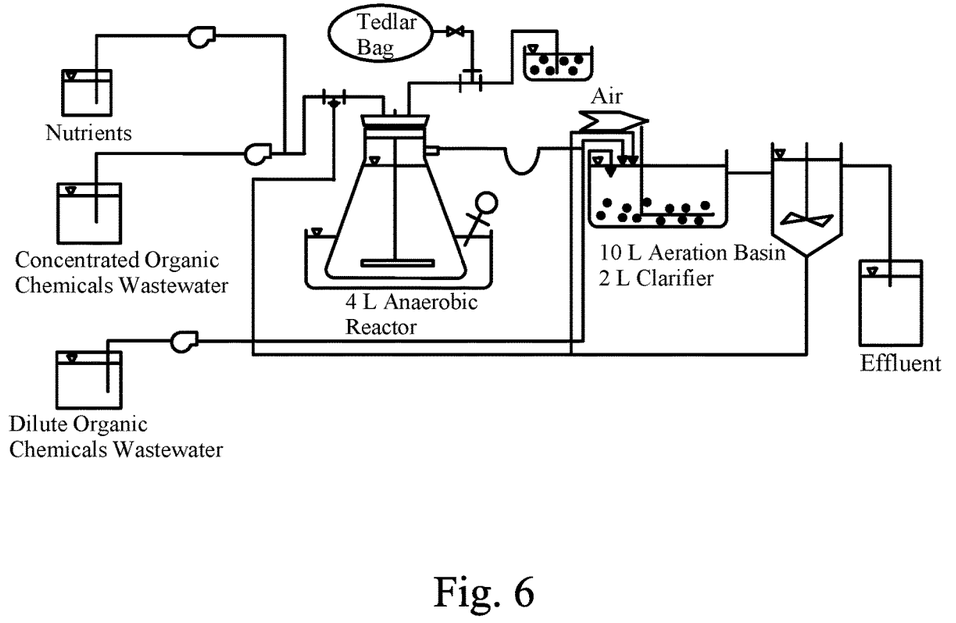
FIG. 6 presents a schematic representation for the experimental bench-scale bioreactor configuration for implementing the IMASS method described in Example 3.

An integrated methanogenic aerobic single sludge for inoculation into a bench-scale bioreactor was prepared by adding biomass from a full-scale UASB treating pre-screened processed bean wastewaters (10 percent biomass contribution), and from an aerated lagoon treating domestic sewage (30 percent biomass contribution), and the balance (60%) from a conventional activated sludge treatment process treating organic chemicals wastewater. The IMASS process configuration is illustrated schematically in FIG. 6. The process operated at a system-wide SRT of 62 days (13 days anerobic followed by 49 days aerobic) for a period of 57 days. The anaerobic zone operated at 35° C. and pH 6.0 to 7.2. The aerobic zone operated at 23° C. and pH 7.7 to pH 8.2. Within the first day, the anaerobic zone was producing biogas and did so daily throughout the treatability study. The aerobic treatment system did not nitrify due to the absence of surplus nitrogen (less than 1 mg/L as ammonia-nitrogen plus nitrate-nitrogen plus nitrite nitrogen). The specific organics present at concentrations greater than 500 mg/L in the wastewater treated within the IMASS anaerobic zone were acetaldehyde, isopropanol, methanol, methyl acetate, polyvinyl acetate, and vinyl acetate. Influent and effluent from the anaerobic reactor were analyzed daily. A single day's measurement of gas production (2.4 liters/day at 53 percent methane content determined by volume accumulation in Tedlar bag and same bag analyses of gas composition). A summary of the results of the IMASS anaerobic zone performance is provided below:
1. The anaerobic zone provided complete removal of the soluble COD fed to this zone, indicating that the IMASS anaerobic zone can be successfully used to reduce target organic compounds. The only biomass acclimated to remove these compounds began as sludge from an aerobic treatment process indicating that acclimated biomass from an aerobic system can be used to successfully start up an anaerobic treatment system for removal of these same organic compounds.
2. Gas production from the anaerobic zone did account for the measured COD removal (3.2 grams per day based on gas production at 0.39 L of methane per gram of COD removed versus a measured soluble COD removal of 3.4 grams per day COD removal measured).

3. The system-wide solids yield was comparable to that of anaerobic biological treatment alone, indicating that biomass generated in the aerobic zone underwent significant digestion in the anaerobic zone. It should be noted that this was accomplished by routing only a slip stream of the return activated sludge through the anaerobic treatment system.
4. The sludge volume index for mixed liquor withdrawn from the aerobic zone was 93 milliliters per gram mixed liquor suspended solids. This SVI likely could have been lower had the anaerobic system operated at a longer SRT and lower discharge volatile acids.

Example 4

Treatment of High Strength Synthetic Domestic Sewage by IMASS

An integrated methanogenic aerobic single sludge for inoculation into a bench-scale bioreactor was prepared by adding biomass from a full-scale UASB treating pre-screened processed bean wastewaters (10 percent biomass contribution) and from a municipal activated sludge treatment system that was preceded by primary clarification (90 percent biomass contribution). The municipal system provided nitrification but not enhanced biological phosphorus removal or intentional denitrification. The IMASS system configuration is illustrated schematically in FIG. 5.

The wastewater used in this study was comprised of acetic acid, dextrose, ammonium hydroxide, phosphoric acid, sodium hydroxide, and sodium bicarbonate. Iron, cobalt, nickel, zinc, copper, manganese, and molybdenum were spiked into the anaerobic reactor 3 days per week at 1 mg/ml.

The system was operated for 50 days at a system-wide SRT of 26 days (19 days anaerobic and 7 days aerobic). The mixed liquor alternated between a 14-hour anaerobic exposure at 35° C. and 7-hour exposure at 25° C. The anaerobic zone was maintained at pH 5.5 to 7.6, and the aerobic zone was maintained at pH 7.3 to 8.5. At the end of this study, 85% of the biomass in the system had been produced under the IMASS configuration.

The results of this study are summarized in Table 2. Influent, effluent, and gas production were analyzed daily. The average gas quality was quantified across eight consecutive days at the end of the study and found to be 63 percent methane at an average total biogas rate of 1.2 liters per day. On one of the last 8 days, the system was analyzed at multiple points for nitrogen species and total phosphorus. Waste sludge from the system was adjusted to pH 4.5 and mixed for 1 hour, filtered to remove free water, analyzed for total phosphorus and found to contain 0.042 g total phosphorus per gram of volatile suspended solids. The mixed liquor taken from the aerobic zone exhibited a sludge volume index (SVI) of 39 mL/g. Other results are summarized and discussed below:

1. Methane was produced in the anaerobic zone at a typical biogas content (63 percent).
2. Denitrification was observed in the anaerobic zone. The return sludge contained 11 mg/L nitrite plus nitrate ($NO_2$—N plus $NO_3$—N), and the anaerobic zone contained less than 0.1 mg/L nitrite plus nitrate.
3. Near complete nitrification was observed across the aerobic zone as no nitrites and nitrates entered the zone, and 11 mg/L of nitrites plus nitrates left the zone along with an effluent ammonia-nitrogen concentration of 0.8 mg/L.
4. Enhanced biological phosphorus removal occurred as evidenced by the biomass content of 0.042 g total phosphorus per gram of VSS of biomass origin. This is more than twice the typical phosphorus content of biomass (0.01 to 0.026 g/g) (See *Industrial Water Quality*, 4th Ed. Wes Eckenfelder, Davis Ford and Andrew Englande, p. 254, WEFPRESS, 2009).
5. The sludge production was 0.14 grams TSS/gram COD removed.
6. Gas production was observed on the first day of operation.
7. Nitrification was not observed until 10 days after startup.
8. Excellent sludge settleability (SVI of 39 mL/g) was observed.
9. Effluent TSS was elevated (62 mg/L) but could be reduced by bypassing wastewater around the anaerobic zone to produce filamentous sludge growth.

TABLE 2

Treatment of high-strength synthetic domestic sewage.

| Parameter Parameter | Influent | RAS | Anaerobic Zone | Waste Sludge | Aerobic Zone | Effluent |
|---|---|---|---|---|---|---|
| Flow, L/day | 3.5 | 3.2 | 6.7 | 0.2 | 6.5 | 3.3 |
| TSS, g/day | 0.0 | 30 | 37[a] | 0.91 | 30 | 0.26 |
| VSS, g/day | 0.0 | 22 | 28[a] | 0.65 | 22 | 0.19 |
| COD, g/day | 8.6 | 31 | 39 | 0.97 | 32 | 1.0 |
| SCOD, g/day | 8.6 | 0.72 | 4.1 | 0.047 | 1.5 | 0.78 |
| TKN, g/day | 0.29 | 1.7 | 1.5 | 0.052 | 1.7 | 0.018 |
| TP, g/day | 0.11 | 0.92 | 1.0 | 0.030 | 0.96 | 0.044 |
| NOx-N, g/day | 0.0 | 0.035 | 0.0 | 0.0022 | 0.072 | 0.036 |

[a]A portion of solids were retained in anaerobic zone as they resisted the vacuum lift.

TABLE 3

Summary of Results of Examples 2-4 IMASS Treatment.

| | WASTE SAMPLE | | |
|---|---|---|---|
| Treatment Observed | Ethanol Feed | Organic Chemicals Wastewater | High Strength Synthetic Domestic Sewage |
| Methanogenesis | + | + | + |
| Aerobic Heterotrophic COD Removal | + | + | + |

TABLE 3-continued

Summary of Results of Examples 2-4 IMASS Treatment.

| Treatment Observed | WASTE SAMPLE | | |
|---|---|---|---|
| | Ethanol Feed | Organic Chemicals Wastewater | High Strength Synthetic Domestic Sewage |
| Anaerobic Digestion of Biomass Produced in Aerobic Zone | + | + | + |
| Luxury P Uptake | NA | NA | + |
| Nitrification | NA | NA | + |
| Denitrification | NA | NA | + |

NA - not applicable

The foregoing discussion along with the Figures discloses and describes various exemplary implementations. These implementations are not meant to limit the scope of coverage, but, instead, to assist in understanding the context of the language used in this specification and in the claims. The Abstract is presented to meet requirements of 37 C.F.R. § 1.72(b) only. The Abstract is not intended to identify key elements of the apparatus and methods disclosed herein or to delineate the scope thereof. Upon study of this disclosure and the exemplary implementations herein, one of ordinary skill in the art may readily recognize that various changes, modifications and variations can be made thereto without departing from the spirit and scope of the invention as described herein and as defined in the following claims.

What is claimed is:

1. An integrated single sludge method for treatment of wastewater comprising the steps of:
    (a) introducing wastewater into a bioreactor;
    (b) starting an initial treatment of the wastewater by inoculation with an integrated single sludge, wherein said initial treatment is under anaerobic or aerobic conditions; and
    (c) carrying out one or more additional treatment steps that provide anaerobic, aerobic, and/or anoxic conditions;
    wherein said integrated single sludge comprises an active aerobic culture and said treatment does not include further inoculations after step (b).

2. The method according to claim 1 wherein said initial treatment is under anaerobic conditions.

3. The method according to claim 2 wherein said integrated single sludge further comprises an active methanogenic culture.

4. The method according to claim 3 wherein said active aerobic culture includes heterotrophs and nitrifying bacteria.

5. The method according to claim 4 wherein said inoculation at step (b) comprises inoculating with the active methanogenic culture and separately inoculating with the active aerobic culture.

6. The method according to claim 5 wherein said treatment is designed to control fermentation, methanogenesis, nitrification, denitrification, and enhanced biological phosphorus removal to desired levels for the treatment.

7. The method according to claim 6 further comprising the steps of clarifying the wastewater and discharging treated wastewater effluent.

8. The method according to claim 7 wherein steps (b) and (c) are conducted for cycle times determined by respective anaerobic and aerobic solids retention times (SRTs) required to achieve said desired levels for the treatment.

9. An integrated single sludge method for treatment of wastewater comprising the steps of:
    (a) introducing wastewater into an anaerobic tank or zone of a bioreactor;
    (b) starting an initial treatment of the wastewater under anaerobic conditions by inoculation with an integrated single sludge that includes anaerobic and aerobic bacteria; and
    (c) carrying out one or more additional treatment steps that provide anaerobic, aerobic, and/or anoxic conditions;
    wherein no further inoculations occur after step (b), and wherein said inoculation at step (b) comprises inoculating with an active methanogenic culture and separately inoculating with an active aerobic culture.

10. The method according to claim 9 further comprising the steps of:
    (d) clarifying the wastewater after steps (b) and (c); and
    (e) discharging the treated wastewater as effluent.

11. The method according to claim 10 wherein said anaerobic treatment at step (b) is carried out for a cycle time determined by the solids retention time (SRT) required to achieve a desired level of anaerobic treatment.

12. The method according to claim 11 wherein said one or more additional treatments at step (c) is carried out for a cycle time determined by the solids retention time (SRT) required to achieve a desired level of aerobic and/or anoxic treatment.

13. The method according to claim 12 wherein said treatment includes one or more objectives selected from fermentation, methanogenesis, nitrification, denitrification, and enhanced biological phosphorus removal.

14. The method according to claim 13 further comprising the step of:
    (f) evaluating the effluent to determine whether the treatment objectives have reached a desired level, and if the level is below the desired level, increasing the solids retention time (SRT), and if the level is higher than the desired level, decreasing the solids retention time (SRT).

15. The method according to claim 14 wherein said bioreactor is selected from sequencing batch reactor, oxidation ditch, and multi-step treatment system.

16. The method according to claim 15 wherein said bioreactor includes a cap or cover to trap gas produced by the treatment.

17. An integrated single sludge method for treatment of wastewater comprising the steps of:
    (a) introducing influent wastewater into an anaerobic zone of a bioreactor wherein a portion of the influent is bypassed around the anaerobic zone to an aerobic zone;
    (b) selecting required operating solids retention times (SRTs) for both anaerobic and aerobic treatment conditions to accomplish desired treatment objective(s);
    (c) selecting a desired mixed liquor suspended solids (MLSS) for solids liquid separation;
    (d) selecting sludge growth (yield) coefficients and influent solids degradation coefficients;
    (e) performing process calculation iterations to determine reactor volume size(s) to satisfy treatment objectives;
    (f) avoiding unionized ammonia-nitrogen ($NH_3$) concentrations present in the anaerobic zone that would cause bio-inhibition to nitrifiers (when applicable);
    (g) increasing an anaerobic and aerobic HRT and associated volume by 5 to 15 minutes to account for a pause in substrate removal;

(h) calculating oxygen requirements in the aerobic zone inclusive of the endogenous oxygen demands of non-nitrifying biomass at its combined MCRT (anaerobic plus aerobic SRT);

(i) if enhanced biological phosphorus (bio-P) removal is desired, subdividing the anaerobic zone into a bio-P zone and broader anaerobic treatment zone;

(j) if denitrification is desired, recirculating mixed liquor from aerobic zone to bio-P zone, or broader anaerobic treatment zone, or anoxic zone; and (k) performing solids separation step.

18. An integrated methanogenic aerobic single sludge method for treatment of wastewater, comprising the steps of:

(a) introducing wastewater into a bioreactor;

(b) starting an initial treatment of the wastewater by inoculation with an integrated single sludge; and (c) carrying out one or more additional treatment steps that provide anaerobic, aerobic, and/or anoxic conditions;

wherein said integrated single sludge comprises an active methanogenic culture and an active aerobic culture and said treatment does not include further inoculations after step (b).

19. The method according to claim 18 wherein said initial treatment is under anaerobic or aerobic conditions.

20. The method according to claim 18 wherein said active aerobic culture includes heterotrophs and nitrifying bacteria.

21. The method according to claim 18 wherein said inoculation at step (b) comprises inoculating with the active methanogenic culture and separately inoculating with the active aerobic culture.

\* \* \* \* \*